United States Patent
Delker et al.

(10) Patent No.: US 8,194,634 B2
(45) Date of Patent: Jun. 5, 2012

(54) METHOD AND SYSTEM FOR EXTENDING A MOBILE DIRECTORY NUMBER TO A LANDLINE-BASED VOICE-OVER-PACKET NETWORK

(75) Inventors: Jason R. Delker, Olathe, KS (US); John M. Everson, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 12/966,331

(22) Filed: Dec. 13, 2010

(65) Prior Publication Data

US 2011/0080899 A1    Apr. 7, 2011

Related U.S. Application Data

(63) Continuation of application No. 11/215,139, filed on Aug. 30, 2005, now abandoned.

(51) Int. Cl.
*H04W 4/00* (2009.01)

(52) U.S. Cl. ......... 370/338; 370/328; 370/351; 370/352; 370/354; 370/356; 370/401; 370/466; 370/467; 455/414.1; 455/426.1; 455/426.2; 455/445; 455/550.1; 455/552.1; 455/553.1; 455/554.1; 455/554.2; 455/556.1; 455/557; 709/227; 709/228; 709/229

(58) Field of Classification Search ............... 455/414.1, 455/426.1, 426.2, 445, 550.1, 552.1, 553.1, 455/554.1, 554.2, 555, 556.1, 557; 370/328, 370/338, 351, 352, 354, 355, 356, 401, 466, 370/467

See application file for complete search history.

(56) References Cited

U.S. PATENT DOCUMENTS

| | | | |
|---|---|---|---|
| 5,715,296 A | 2/1998 | Schornack et al. | |
| 5,812,637 A | 9/1998 | Schornack et al. | |
| 5,933,774 A * | 8/1999 | Bertocci | 455/417 |
| 5,946,616 A | 8/1999 | Schornack et al. | |
| 6,253,088 B1 | 6/2001 | Wenk et al. | |
| 6,556,826 B1 | 4/2003 | Johnson et al. | |
| 6,600,734 B1 | 7/2003 | Gernert et al. | |
| 6,704,580 B1 * | 3/2004 | Fintel | 455/550.1 |
| 6,741,586 B1 | 5/2004 | Schuster et al. | |
| 6,741,695 B1 * | 5/2004 | McConnell et al. | 379/229 |
| 6,744,759 B1 | 6/2004 | Sidhu et al. | |
| 6,775,522 B2 | 8/2004 | Schornack et al. | |
| 6,782,617 B2 | 8/2004 | Pulizzi | |
| 6,785,517 B2 | 8/2004 | Schornack et al. | |
| 6,842,617 B2 | 1/2005 | Williams et al. | |
| 7,162,236 B2 * | 1/2007 | Dorenbosch et al. | 455/432.1 |
| 7,647,051 B2 * | 1/2010 | Bennett et al. | 455/445 |
| 7,664,100 B2 * | 2/2010 | Nejah | 370/352 |
| 2002/0086703 A1 | 7/2002 | Dimenstion et al. | |
| 2003/0039242 A1 | 2/2003 | Moore, Jr. | |
| 2003/0096612 A1 | 5/2003 | Kim et al. | |
| 2003/0109994 A1 | 6/2003 | Dubil et al. | |
| 2003/0217174 A1 | 11/2003 | Dorenbosch et al. | |
| 2004/0133668 A1 | 7/2004 | Nicholas, III | |
| 2004/0235482 A1 | 11/2004 | Sylvain | |
| 2005/0239496 A1 * | 10/2005 | Sylvain | 455/552.1 |
| 2006/0019655 A1 * | 1/2006 | Peacock | 455/426.1 |
| 2007/0047707 A1 * | 3/2007 | Mayer et al. | 379/114.28 |
| 2007/0049342 A1 * | 3/2007 | Mayer et al. | 455/558 |

* cited by examiner

*Primary Examiner* — Olumide T Ajibade Akonai

(57) ABSTRACT

A mobile station is coupled to a docking station that has a landline connection to a packet-switched network. In response, the mobile station's mobile directory number (MDN) is registered, via the packet-switched network, as being accessible via the docking station. As a result, when a call is placed to the MDN, the call is routed to the docking station via the packet-switched network. Communication devices coupled to the docking station may then be used to answer the call and/or participate in the call.

10 Claims, 5 Drawing Sheets

METHOD AND SYSTEM FOR EXTENDING A MOBILE DIRECTORY NUMBER TO A LANDLINE-BASED VOICE-OVER-PACKET NETWORK

CROSS REFERENCE TO RELATED APPLICATION

This is a continuation of U.S. Ser. No. 11/215,139, filed Aug. 30, 2005, now abandoned entitled "Method and System for Extending a Mobile Directory Number to a Landline-Based Voice-Over-Packet Network."

BACKGROUND OF THE INVENTION

1. Field of the Invention

The present invention relates to telecommunications and, more particularly, to a method and system that uses a docking station to extend the use of a mobile station's mobile directory number to other communication devices.

2. Description of Related Art

Many people are increasingly relying on wireless communication devices, such as wireless telephones, for telecommunications in areas, such as residential locations, where landline telephones have traditionally been used. Indeed, it is increasingly common for people not to subscribe to any landline telephone service at home but to rely on wireless service instead.

Currently, a wireless service subscriber can use a docking station to communicatively couple a wireless telephone to landline telephones located, for example in the subscriber's home. In this approach, the wireless telephone is used to receive and to originate calls via the wireless network, and the landline telephones coupled to the wireless telephone are able to participate in the calls. In many residential locations, however, wireless coverage may be weak, spotty, unreliable, or unavailable. Thus, the reliance on the wireless network for communications in this approach can be a significant limitation.

Accordingly, there is a need to provide ways to extend the use of wireless telephones, particularly to areas where wireless coverage may be unreliable.

SUMMARY

In a first principal aspect, an exemplary embodiment of the present invention provides a method of using a mobile station. The mobile station has a directory number for receiving calls via a wireless network. In accordance with the method, the mobile station is coupled to the docking station, the docking station being communicatively coupled to a packet-switched network. In response to the coupling step, the directory number is registered, via the packet-switched network, as being accessible via the docking station.

In a second principal aspect, an exemplary embodiment of the present invention provides a docking station for a mobile station. The mobile station has a directory number for receiving calls via a wireless network. The docking station comprises recharger contacts for recharging the mobile station, a sensing circuit for sensing when the mobile station is electrically connected to the recharger contacts, and a packet interface communicatively coupled to a packet-switched network. When the mobile station is electrically connected to the recharger contacts, the docking station registers the directory number, via the packet-switched network, as being accessible via the docking station.

DETAILED DESCRIPTION OF EXEMPLARY EMBODIMENTS

1. Overview

Figure 1:
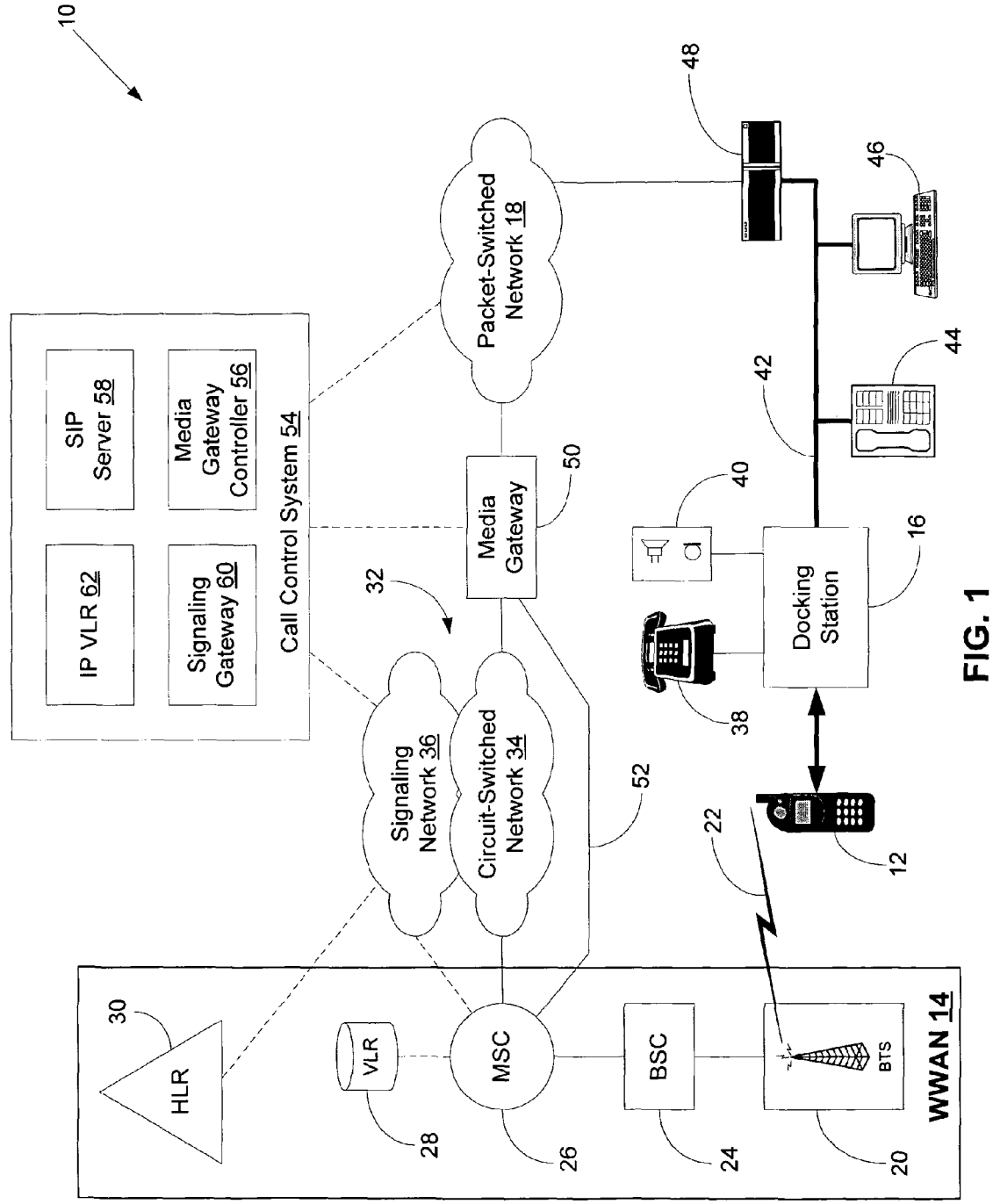
FIG. 1 is a block diagram of a telecommunications system, in accordance with an exemplary embodiment of the present invention.

The present invention, in its preferred embodiments, extends the use of a directory number that a mobile station uses to originate and receive calls via a wireless network to a landline-based voice-over-packet (VoP) network. In an exemplary embodiment, the landline-based VoP network includes a docking station for the mobile station. The docking station is communicatively coupled to a packet-switched network via a broadband, landline connection, e.g., using a cable modem, DSL modem, or router. The landline connection enables the docking station to send and receive voice and/or other media in a packetized format. When the mobile station is coupled to the docking station, the mobile station's directory number is registered, via the packet-switched network, as being accessible via the docking station. As a result, calls to that directory number are sent to the docking station, via the packet-switched network, rather than over the wireless network.

The mobile station could be, for example, a wireless telephone, wirelessly equipped personal digital assistant (PDA), or other wireless communication device. The mobile station is able to originate and receive calls via at least one type of wireless network, such as a wireless wide area network (WWAN) and/or a wireless local area network (WLAN). Thus, the mobile station may be able to communicate via a WWAN, e.g., using CDMA, TDMA, GSM, or EV-DO. The mobile station may also be able to communicate via a WLAN, e.g., using IEEE 802.11x, HiperLAN, HomeRF, or Bluetooth.

The mobile station may be identified by a directory number, such as a mobile directory number (MDN), when communicating with the wireless network. When a call is placed to the mobile station's MDN, the call may be routed to the wireless network, which then pages and alerts the mobile station so that the mobile station can answer the incoming call. In addition, when the mobile station originates a call via the wireless network, the mobile station's MDN may be identified as the calling party number. However, when the mobile station is coupled to the docking station of the present invention, the MDN may be registered, via the packet-switched network, as being accessible via the docking station. The coupling that triggers the registration could be communicative coupling. In particular, the mobile station could be communicatively coupled to the docking station such that the mobile station is able communicate via the docking station, e.g., to originate or receive calls. The communicative coupling could occur via an electrical connection, such as a serial, USB, or FireWire connection. Alternatively, the communicative coupling could occur wirelessly, e.g., via Near Field Communication NFC), contactless smartcard-type coupling, or Bluetooth. The act of communicatively coupling the mobile station to the docking station may trigger the registration of the mobile station's MDN via the packet-switched network, The MDN may then be periodically re-registered via the packet-switched network, while the mobile station remains communicatively coupled to the docking station.

Alternatively, the coupling that triggers the registration could be electrically connecting the mobile station to recharger contacts on the docking station. When electrically connected in this way, a recharger may power the mobile station through the recharger contacts. The act of electrically connecting the mobile station to the recharger contacts may trigger the registration of the mobile station's MDN via the packet-switched network, The MDN may then be periodically re-registered via the packet-switched network, while the mobile station remains powered through the recharger contacts As yet another possibility, the coupling that triggers registration could be mechanical. For example, the physical coupling of the mobile station to the docking station could close a switch or depress a button on the docking station, which, in turn, causes the registration to occur. The MDN may then be periodically re-registered via the packet-switched network, while the mobile station remains mechanically coupled to the docking station. In addition, still other triggers for registration are possible.

In an exemplary embodiment, the registration of the mobile station's MDN via the packet-switched network occurs by means of a SIP REGISTER message that is sent to a SIP registrar via the packet-switched network. The SIP REGISTER message could he sent by a SIP user agent in either the mobile station or the docking station. Thus, if the mobile station has its own SIP user agent, and is communicatively coupled to the docking station, then the mobile station may transmit the SIP REGISTER message to the SIP registrar via the docking station. In other cases, the docking station may include a SIP user agent that transmits a SIP REGISTER message to register the mobile station's MDN on behalf of the mobile station.

With the mobile station's MDN registered as being accessible via the docking station, calls to the MDN are sent to the docking station rather than over the wireless network. Thus, if the docking station receives a call to the mobile station's MDN, and the mobile station is communicatively coupled to the mobile station, the mobile station may be alerted and may be used to answer the call. During the call, the mobile station may send and receive voice or other media via the docking station. Alternatively, or additionally, other communication devices communicatively coupled to the docking station may also be alerted to the incoming call, answer the call, and/or participate in the call. Such communication devices may include, for example, VoP communication devices, analog telephony devices, and/or "dumb" speaker/microphone terminals. The mobile station or other, communication devices communicatively coupled to the docking station may also be able to originate calls via the docking station, using the mobile station's MDN as the calling party number.

The mobile station or docking station may periodically re-register the MDN, via the packet-switched network, as being accessible via the docking station, so long as (1) the mobile station remains coupled to the docking station, (2) the docking station remains powered, and (3) the docking station maintains connectivity via the packet-switched network. When any of these three conditions no longer applies, then the periodic registrations via the packet-switched network may cease, and calls to the mobile station's MDN would no longer be sent to the docking station. Instead, the mobile station may register via the wireless network, so that calls to the mobile station's MDN are sent over the wireless network.

In an exemplary embodiment, while the mobile station is in a state such that its MDN is being registered via the docking station, the mobile station may cease registration via the wireless network, in order to ensure that calls to the MDN are routed via the packet-switched network rather than via the packet-switched network. Alternatively, the mobile station may continue to register via the wireless network, for example, as a backup registration that could be used if an attempt to route a call to the mobile station's MDN via the packet-switched network fails.

Either the mobile station or' the docking station could monitor whether periodic re-registrations via the packet-switched network should continue. For example, the mobile station may sense whether it is being powered through the recharger contacts, If the mobile station is no longer being powered through the recharger contacts, e.g., because the mobile station is no longer electrically connected to the recharger contacts or because the docking station is no longer being powered, then the mobile station may register its MDN via the wireless network rather than via the packet-switched network. Alternatively, the docking station may sense whether the mobile station is still coupled to the docking station, e.g., still electrically connected to the recharger contacts. If the mobile station is no longer coupled to the docking station, then the docking station may stop registering the mobile station's MDN via the packet-switched network.

In this way, the use of a mobile station's directory number may be extended to other communication devices when the landline-based VoP network may be more convenient than the wireless network to send and receive calls, e.g., when the mobile station is being recharged. However, when the mobile station is no longer being recharged, when the power is out so that the docking station can no longer function, or when the docking station loses connectivity via the packet-switched network, the mobile station may revert to using the wireless network.

2. Exemplary Network Architecture

FIG. 1 is a simplified block diagram of an exemplary telecommunications system 10 in which exemplary embodiments of the present invention may be employed. In FIG. 1, connections that carry primarily voice or other media are shown as solid lines and connections that carry primarily signaling are shown as dashed lines.

As shown in FIG. 1, mobile station 12 is able communicate with a wireless wide area network (WWAN) 14 and is able to be coupled to a docking station 16, which, in turn, is communicatively coupled to a packet-switched network 18. Mobile station 12 may be a wireless telephone, wireless personal digital assistant (PDA), or other wireless communication device, In addition to WWAN 14, mobile station 12 may be able to communicate with other types of wireless networks. For example, mobile station 12 may be able to communicate with a wireless local area network (WLAN), e.g., using IEEE 802.11x, HiperLAN, HomeRF, or Bluetooth.

WWAN 14 may provide wireless coverage in a relatively large geographic area, such as an entire city, often by using a plurality of contiguous wireless coverage areas, such as cells or sectors. WWAN 14 may include a base transceiver station (BTS) 20 that provides a wireless coverage area within which BTS 20 may communicate with one or more mobile stations, such as mobile station 12, over an air interface 22. Although FIG. 1 shows only one BTS, it is to be understood that WWAN 14 may include a plurality of BTSs that may provide a plurality of wireless coverage areas. The communications between BTS 20 and mobile station 12 may occur in a digital format, such as CDMA, TDMA, GSM, or they may occur in an analog format, such as AMPS. The communications could be voice only, data only (e.g., using EV-DO), or may include a combination of voice and data (e.g., using EV-DV). A preferred wireless communications format is cdma2000 such as described in EIA/TIA/IS-2000 Series, Rev. A (published March 2000), which is incorporated herein by reference.

BTS 20 may be controlled by a base station controller (BSC) 24, which, in turn, may be controlled by a mobile switching center (MSC) 26. Although FIG. 1 shows only one MSC and only one BSC, it is to be understood that WWAN 14 may include a plurality of MSCs, which may, in turn, control a plurality of BTSs, via a plurality of BSCs. MSC 26 also has access to a visitor location register (VLR) 28. VLR 28 stores data records for mobile stations that are being served by MSC 26. Although FIG. 1 shows VLR 28 as a network element separate from MSC 26, VLR 28 may be integrated or co-located with MSC 26.

WWAN 14 may also include a home location register (HLR) 30 that stores a data record for mobile station 12. The data record stored in HLR 30 for mobile station 12 may identify mobile station 12, such as by mobile directory number (MDN), mobile station identification (MS), and/or electronic serial number (ESN) and may include a last known location of mobile station 12. For example, the data record may identify the VLR that most recently registered mobile station 12 with HLR 30. The data record may also include status information for mobile station 12, a service profile for mobile station 12, and other information relating to mobile station 12.

MSC 26 is connected to the public switched telephone network (PSTN) 32. PSTN 32 may use an out-of-band signaling system, such as Signaling System 7 (SS7) to route calls, Thus, PSTN 32 may include a circuit-switched network 34 that carries bearer traffic, i.e., the voice or other media in calls, and a signaling network 36 that carries signaling traffic used to set up, tear down, monitor, and control calls. Circuit-switched network 34 may include a plurality of trunks, with each trunk carrying media in a time division multiplex (TDM) format. Signaling system 36 may include a plurality of networked signal transfer points (STPs).

MSC 26 may communicate with signaling network 36, e.g., using SS7, to route calls via circuit-switched network 34 to and from mobile stations operating in its service area. To provide such telecommunications services, MSC 26 may also communicate with HLR 30 via signaling network 36. The communications between MSC 26 and HLR 30 may conform to IS-41 specifications. A recent revision of the IS-41 specifications, ANSI/TIA/EIA-41-D-97, published in December 1997, is incorporated herein by reference. The IS-41 signaling may be carried in signaling network 36 as an S87 application layer.

Mobile station 12 may be coupled to docking station 16, as described in more detail below. Docking station 16 may also be communicatively coupled to other types of communication devices. For example, docking station 16 may be communicatively coupled to analog telephony devices, such as analog telephone 38, and/or to "dumb" terminals, such as speaker/microphone terminal 40. Docking station 16 may also be communicatively coupled to communication devices via a local area network (LAN) 42. LAN 42 may carry voice, data, and/or other media in a packet-based format and may be connected to communication devices that exchange voice in a packet-based format. For example, LAN 42 may be connected to a voice-over-packet (VoP) telephone 44 and/or a personal computer 46 that is equipped for audio communication, e.g., equipped with a microphone and speaker.

LAN 42 may be communicatively coupled to packet-switched network 18, via a network access device 48. Network access device 48 could be, for example, a cable modem, DSL modem, or router. Packet-switched network 18 may route packets using a network protocol, such as the Internet Protocol (p), in combination with the User Datagram Protocol (UDP) or Transmission Control Protocol (TCP). The IP packets may be carried over lower level protocols, such as asynchronous transfer mode (ATM) protocols. Protocols, such as the Real-Time Transport Protocol (RTP), may be used to carry voice or other media through packet-switched network 18 in a real-time format. Relevant aspects of RTP are described in Schulzrinne, et al., "RTP: A Transport Protocol for Real-Time Applications," Request for Comments 1889 (January 1996), which is incorporated herein by reference.

Other protocols, such as the Session Initiation Protocol (SIP), may be used to set up and/or manage communication sessions through packet-switched network 18. Voice, data, and/or other media may be exchanged in such communication sessions. Relevant aspects of SIP are described in Rosenberg, et al, "SIP: Session Initiation Protocol," Request for Comments 3261 (June 2002), which is incorporated herein by reference. SIP and/or other, protocols may, in turn, use the Session Description Protocol (SDP) to describe the communication sessions that are being set up or managed. Relevant aspects of SDP are described in M. Handley, et al., "SDP: Session Description Protocol," Request for Comments 2327 (April 1998), which is incorporated herein by reference.

Packet-switched network 18 may be communicatively coupled to circuit-switched network 34, via a media gateway 50. Media gateway 50 may convert between media formats used in circuit-switched network 34 and packet-switched network 18. For example, media gateway 50 may receive media from circuit-switched network 34 in a TDM format and convert the media into an RTP format for transmission over packet-switched network 18, and vice-versa. Media gateway 50 may also be connected to, or integrated with, MSCs, such as MSC 26. Thus, MSC 26 may have a bearer connection with media gateway 50 via an intermachine trunk (IMT) 52.

Telecommunications system 10 may include a call control system 54 that functions to route calls through media gateway 50 and packet-switched network 18. Call control system 54 may include a number of functional components. For example, call control system 54 may include a media gateway controller 56, a SIP server 58, a signaling gateway 60, and an IP VLR 62. These components may be provided in a single network element, such as a softswitch. Alternatively, these components may be distributed among multiple network elements.

Media gateway controller 56 may function to control media gateway 50, for example, to extend calls from PSTN 32 to packet-switched network 18, or, vice versa. Media gateway control 56 may communicate with media gateway 50 via a signaling link, e.g., using the Media Gateway Control Protocol (MGCP). Relevant aspects of MGCP are described in F. Andreason, et al., "Media Gateway Control Protocol (MGCP) Version 1.0," Request for Comments 3435 (January 2003), which is incorporated herein by reference.

SIP server 58 may communicate with SIP user agents to set up and control voice calls and other communication sessions through packet-switched network 18. More particularly, SIP server 58 may function as a SIP registrar that registers SIP user agents through the use of the SIP REGISTER method.

SIP server 58 may also function as a SIP proxy server, e.g., to set up communication sessions using the SIP INVITE method. As described in more detail below, mobile station 12 could have its own SIP user agent, or docking station 16 may include a SIP user agent that engages in SIP signaling on behalf of mobile station 12. SIP server 58 may correspond to a call session control function (CSCF) in an IP multimedia subsystem (IMS) service architecture.

Signaling gateway 60 functions to convert between the signaling format used in packet-switched network 18, e.g., SIP, and the signaling format used in signaling network 36, e.g., SS7 and IS-41. Thus, using signaling gateway 60, call control system 54 can communicate with MSC 26 and HLR 30, via signaling network 36.

IP VLR 62 serves as a visitor location register for packet-switched network 18, storing a data record for each mobile station that has registered with SIP server 58 via packet-switched network 18. In particular, when a mobile station is registered with SIP server 58, call control system 54 may obtain a service profile for that mobile station from HLR 30, e.g., by having signaling gateway 60 send an IS-41 REGNOT message to HLR 30. Call control system 54 may then store the service profile for that mobile station in IP VLR 62. In this way, IP VLR 62 keeps track of which mobile stations are currently accessible via packet-switched network 18.

3. Exemplary Docking Station

Figure 2:
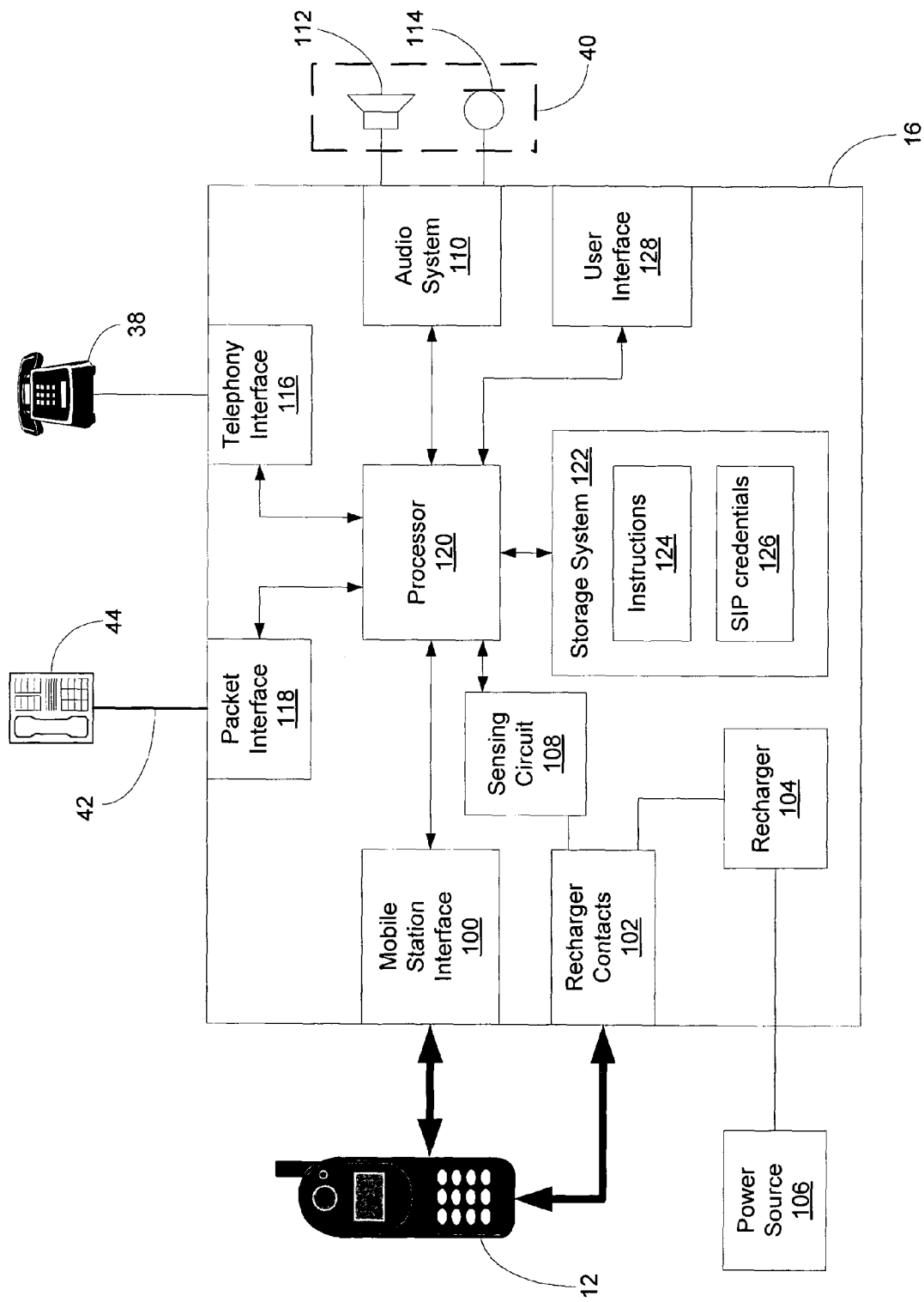
FIG. 2 is block diagram of a docking station, in accordance with an exemplary embodiment of the present invention.

FIG. 2 is a block diagram illustrating an exemplary docking station 16 that can couple to mobile station 12. Docking station 16 may include a mobile station interface 100 for communicatively coupling to mobile station 14. Thus, mobile station 12 and docking station 16 may exchange signals, such as control signals, data, and/or the voice or other media exchanged during a call, via mobile station interface 100. In some embodiments, mobile station 12 becomes communicatively coupled to mobile station interface 100 via direct electrical connection. For example, mobile station interface 100 may include electrical contacts that mate with corresponding electrical contacts on mobile station 12. Alternatively, mobile station 12 may be electrically connected to mobile station interface 100 via an electrical cable, e.g., using USB or FireWire. In some embodiments, mobile station 12 may be able to wirelessly couple to mobile station interface 100, for example, using Bluetooth, IrDA, NFC, or contactless smart-card-type coupling.

Docking station 16 may also include recharger contacts 102 for recharging mobile station 12 when it is connected to docking station 16. Recharger contacts 102 are connected to a recharger 104, which, in turn, is connected to a power source 106. Power source 106 may be an AC power source, such as a standard wall outlet, or a DC power source, such as an AC adapter, AC-to-DC converter, or one or more batteries. Power source 106 may power other components in docking station 16 in addition to recharger 104. When recharger contacts 102 are electrically connected to corresponding contacts on mobile station 12, either directly or through a cable, recharger 104 may operate to recharge mobile station 12. In addition, docking station 16 may include a sensing circuit 108 for sensing when mobile station 12 is electrically connected to recharger contacts 102.

Docking station 16 may be physically configured so as to include a cradle or other receptacle for receiving mobile station 12. Electrical contacts for mobile station interface 100 and/or recharger contacts 102 may be disposed in the receptacle so as to mate with corresponding contacts on mobile station 12 when mobile station 12 is properly positioned in the receptacle.

Docking station 16 may also include a built-in audio system 110 for processing audio signals. Such processing may include, for example, amplification, digital-to-analog conversion, and/or analog-to-digital conversion. Audio system 110 may be communicatively coupled to a speaker 112 and a microphone 114. Audio system 110 may play audio signals through speaker 112, such as alert patterns for incoming calls or the voice or other media exchanged during a call. Audio system 110 may also process audio signals received through microphone 114, such as voice from a user during a call.

Speaker 112 and microphone 114 could be built into docking station 16. Alternatively, speaker 112 and microphone 114 could be disposed in a "dumb" speaker/microphone terminal, such as speaker/microphone terminal 40. Such speaker/microphone terminals may be electrically connected, e.g., plugged into, audio system 110. Alternatively, speaker/microphone terminals may be wirelessly coupled to audio system 110, e.g., using Bluetooth or IrDA. Thus, although FIG. 2 shows audio system 110 with only one speaker and one microphone, it is to be understood that audio system 110 maybe connected to multiple speakers and microphones.

Docking station 16 may also include one or more interfaces for communicatively coupling other types of communication devices. For example, docking station 16 may include a telephony interface 116 for communicatively coupling to one or more analog telephony devices, such as analog telephone 38. Telephony interface 116 may transmit audio signals to and from analog telephone 38 and may convert between the analog format used by analog telephone 38 and a digital format used in docking station 16. Telephony interface 116 may also include circuitry to detect whether analog telephone 38 is on-hook or off-hook, a signal generator for generating central office signals such as dial tones, ringback tones, and busy signals, and a ringer for ringing analog telephone 38.

Docking station 16 may also include a packet interface 118 for communicatively coupling to LAN 42, which, in turn, may be coupled to VoP communication devices, such as VoP telephone 44. As shown in FIG. 1, LAN 42 is communicatively coupled to packet-switched network 18 via network access device 48. Thus, docking station 16 may receive VoP calls that are routed through packet-switched network 18, via packet interface 118. Docking station 16 may also originate VoP calls via packet interface 118.

Docking station 16 may also include a processor 120, which may be coupled to mobile station interface 100, sensing circuit 108, audio system 110, telephony interface 116, packet interface 118, and to a storage system 122. Storage system 122 may include volatile and/or non-volatile memory. Storage system 122 may store software programming, e.g., as a set of instructions 124, which controls the operation of docking station 16. In some embodiment, instructions 124 may include a VoP client that enables docking station 16 to originate and to receive VoP calls. Thus, if SIP is used for setting up VoP calls, the VoP client may include a SIP user agent. Storage system 122 may also store various types of data. For example, storage system 122 may store SIP credentials 126 that the VoP client may use for SIP signals. In particular, if the VoP client engages in SIP signaling on behalf of mobile station 12, then SIP credentials 126 may include the mobile directory number (MDN) of mobile station 12 as well as other information needed to register that MDN using the SIP REGISTER method.

Processor 120 may also be coupled to a user interface 128, through which processor 120 may receive input from the user and through which processor 120 may convey information to the user. Thus, user interface 128 may include a keypad, touch screen, buttons, or other input devices to receive input from the user. User interface 128 may also include a display screen or, other output device to convey information to the user, e.g., in a graphical or textual form. In some cases, user interface 128 may be used in conjunction with audio system 110, e.g., to originate or to answer calls.

Processor 120 may convey audio signals, e.g., in a digital format, between mobile station interface 100, audio system 110, telephony interface 116, and packet interface 118. For example, in order to alert a user of an incoming call, processor 120 may convey an alert pattern to audio system 110, to telephony interface 116, and/or to packet interface 118. Audio system 110 may, in turn, play the alert pattern through speaker 112 of terminal 40, telephony interface 116 may ring analog telephone 38 in accordance with the alert pattern, and packet interface 118 may convey the alert pattern to VoP telephone 44 and audio-equipped computer 46 so that it can be played through their respective audio systems The alert pattern could be specific to docking station 16, or it could be specific to mobile station 12. To play an alert pattern that is specific to mobile station 12, mobile station 12 may transmit the alert pattern, when notified of an incoming call, to mobile station interface 100 and processor 120 may then convey the alert pattern as described above. Alternatively, an alert pattern used by mobile station 12, a distinctive alert pattern that a user has selected for mobile station 12, may be stored in storage system 122. When docking station 16 receives an incoming call, processor 120 may retrieve the alert pattern stored in storage system 122 and convey it as described above Processor 120 may also convey the voice or other media exchanged during a call between mobile station interface 100, audio system 110, telephone interface 116, and packet interface 118. In this way, when mobile station 12 is engaged in a call while communicatively coupled to docking station 16, speaker/microphone terminal 40, analog telephone 38, and VoP telephone 44 may also participate in the call.

4. Exemplary Operation

Figure 3:
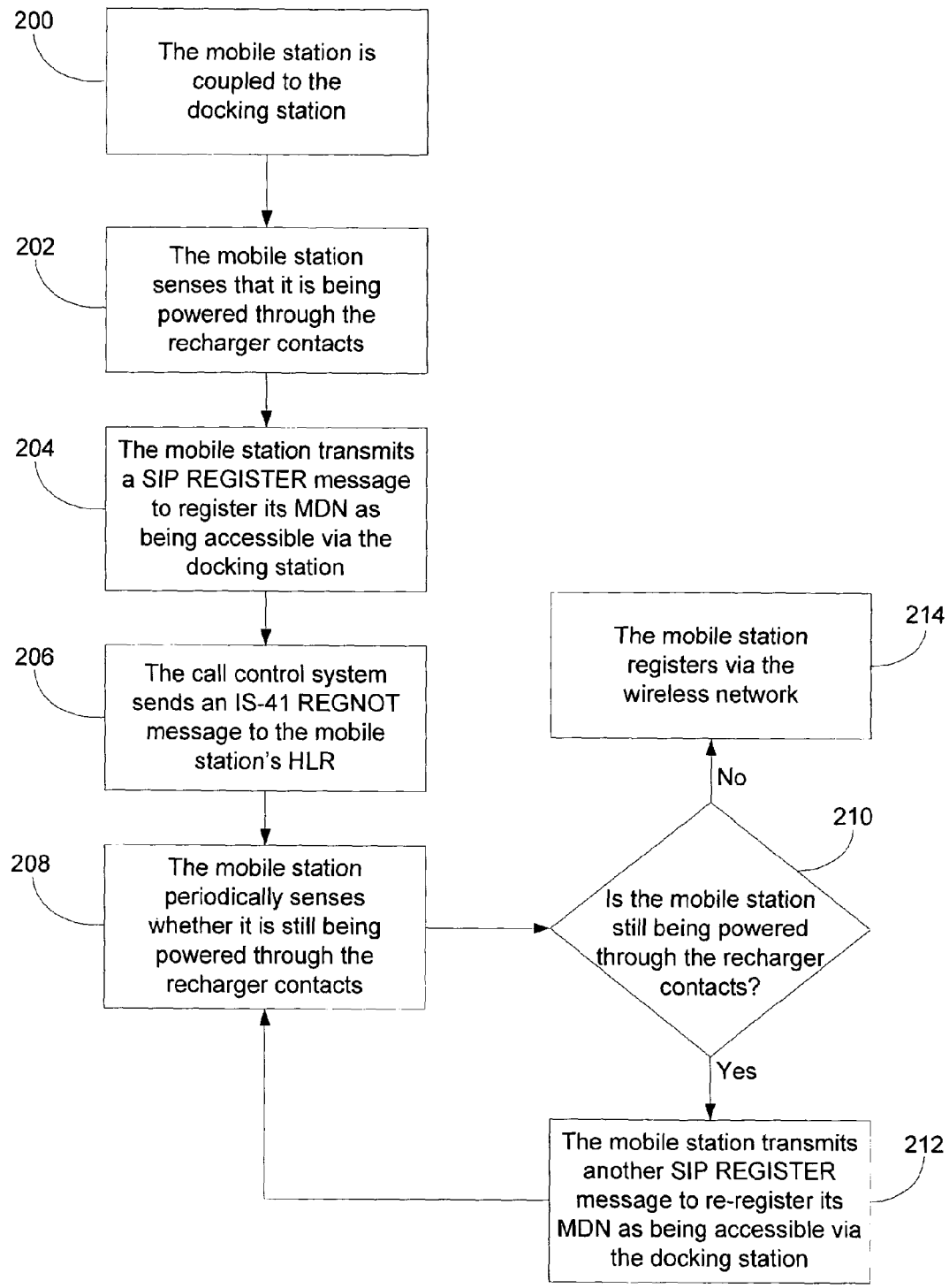
FIG. 3 is a flow chart illustrating a method in which a mobile station coupled to a docking station registers its mobile directory number, (MDN) as being accessible via the docking station, in accordance with an exemplary embodiment of the present invention.
Figure 4:
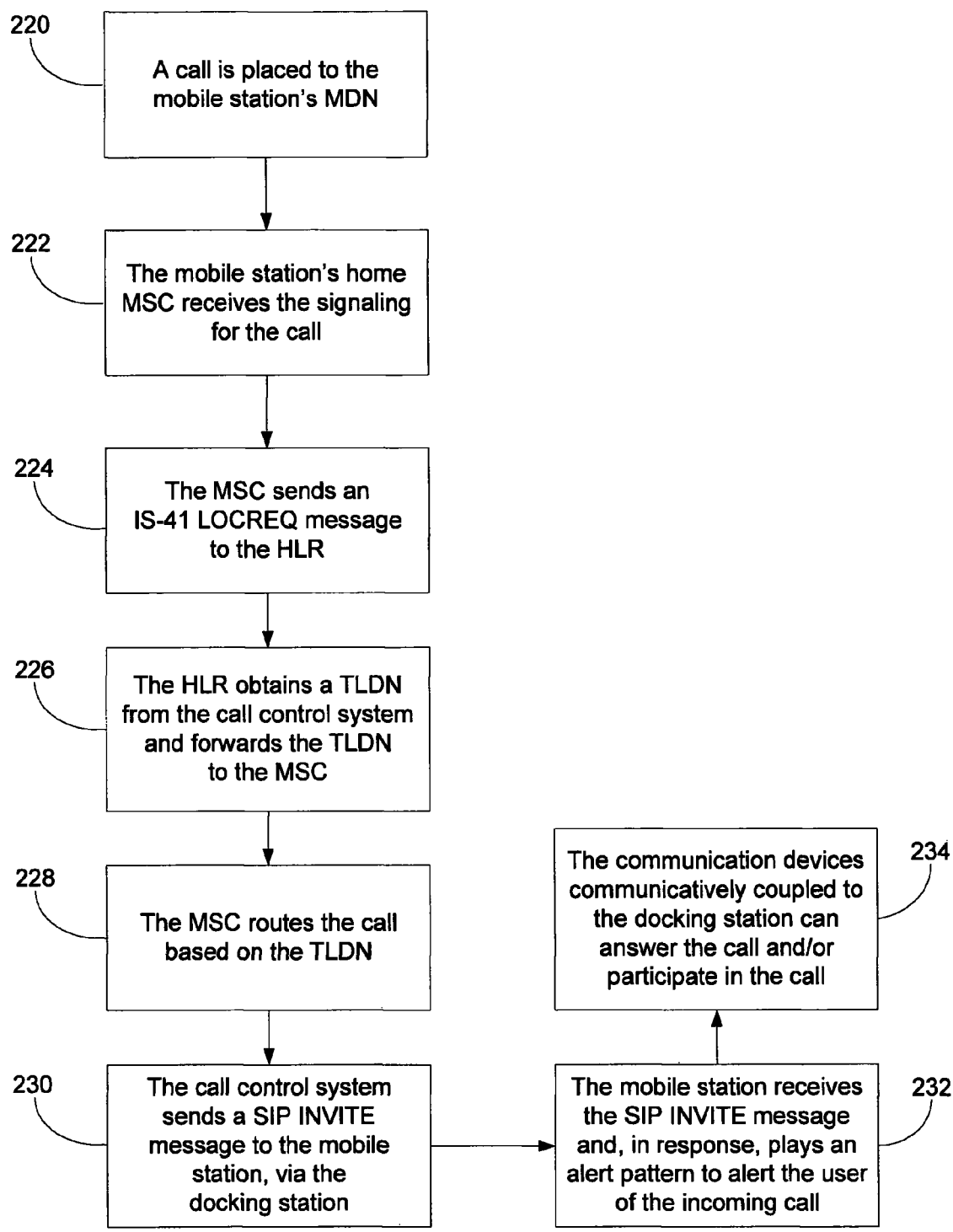
FIG. 4 is a flow chart illustrating a method of routing a call to the MDN registered as in FIG. 3, in accordance with an exemplary embodiment of the present invention.
Figure 5:
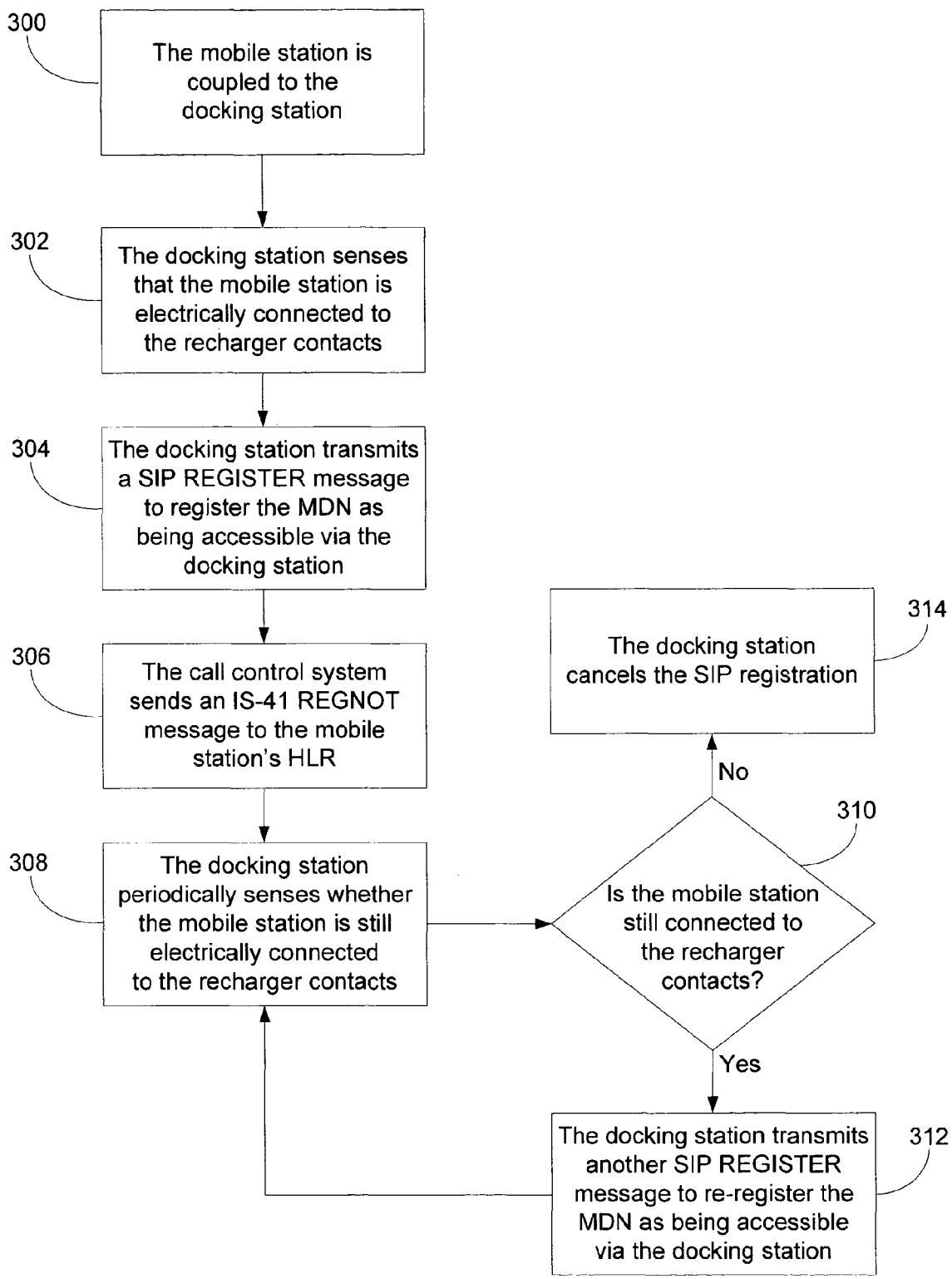
FIG. 5 is a flow chart illustrating a method in which a docking station registers the MDN of a mobile station coupled to it as being accessible via the docking station, in accordance with an exemplary embodiment of the present invention.

FIGS. 3-5 are flowcharts illustrating exemplary methods of operation. These examples assume the network architecture shown in FIG. 1 and the docking station configuration shown in FIG. 2. It is to be understood, however, that other network architectures and other docking station configurations could be used.

FIG. 3 illustrates an example in which the mobile station has its own SIP user agent, The process may begin when the mobile station is coupled to the docking station, as indicated by block 200. In this example, the mobile station is coupled to the docking station by communicatively coupling to mobile station interface 100 and by electrically connecting to recharger contacts 102. When the mobile station is electrically connected to recharger contacts 102, recharger 104 electrically powers the mobile station through recharger contacts 102. The mobile station may include a battery that the mobile station uses as a power source when it is not otherwise connected to a power source. Thus, the electrical power delivered by the recharger may be used to recharge the battery in the mobile station and/or otherwise power the mobile station.

The mobile station senses that it is being powered through the recharger, contacts, as indicated by block 202. In response, the mobile station transmits a SIP REGISTER message to register its MDN as being accessible via the docking station, as indicated by block 204. For example, the "From" field of the SIP REGISTER message may include the mobile station's MDN, in the form of a SIP URL, and the "Contact" field may include a SIP URL that corresponds to the docking station. The mobile station may transmit the SIP REGISTER message to the docking station via mobile station interface 100. The docking station may then forward the SIP REGISTER message to packet interface 118, so that the message is transmitted through LAN 42, network access device 48, and packet-switched network 18. In this example, SIP server 58 functions as the SIP registrar. Thus, the SIP REGISTER message reaches call control system 54.

In response to the SIP REGISTER message, the call control system updates the SIP registration for the mobile station, e.g., by uploading the registration information to a location service. The call control system also sends an IS-41 REGNOT message to register the MDN with the mobile station's HLR, as indicated by block 206. For example, signaling gateway 60 may transmit the REGNOT message to HLR 30 via signaling network 36. The REGNOT message may include the mobile station's MDN and may include an MSCID or other identification of call control system 54 as the system currently serving the mobile station. In response to the REGNOT message, HLR 30 updates its data record for the mobile station to indicate that the mobile station is currently being served by call control system 54. HLR 30 may also send call control system 54 a service profile for the mobile station, which call control system 54 may store in IP VLR 62.

As a result of this registration, calls placed to the mobile station's MDN are routed through the docking station, as described below. However, the mobile station's registration may need to be periodically renewed, e.g., with re-registration every 30 minutes or other specified time period, in order to stay current. Thus, the mobile station may periodically sense whether it is still being powered through the recharger contacts, as indicated by block 208. How the mobile station re-registers its MDN may depend on whether the mobile station is still being powered through the recharger contacts, as indicated by block 210. If the mobile station is still being powered through the recharger contacts, the mobile station may transmit another SIP REGISTER message to re-register its MDN as being accessible via the docking station, as indicated by block 212. The SIP REGISTER message may be received by call control system, as described above, and the call control system may responsively send another IS-41 REGNOT message to re-register with the HLR. After this re-registration, the mobile station may continue to periodically sense whether it is still being powered through the recharger contacts, as indicated by block 208.

If, however, the mobile station senses that it is no longer being powered through the recharger contacts, then the mobile station may register via the wireless network, as indicated by block 214. This may occur when the mobile station is disconnected from the recharger contacts, or when the recharger is no longer being powered, e.g., because of a power outage or because the docking station has been unplugged from its power source. To register via the wireless network, the mobile station may wirelessly transmit a registration message. For example, mobile station may be within the wireless coverage area of BTS 20, such that BTS 20 receives the registration message. In response, MSC 26 may transmit an IS-41 REGNOT message to HLR 30. HLR 30 may then update its data record for the mobile station to indicate that it is currently being served by MSC 26. As a result, calls placed to the mobile station's MDN will be routed via WWAN 14 to reach the mobile station wirelessly, rather than through the docking station. HLR 30 may also transmit an IS-41 REGCAN message to call control system 54 to cancel the mobile station's registration in IP VLR 62.

In the example of FIG. 3, the powering of the mobile station through the docking station's recharger contacts served as the "trigger" for registering the mobile station's MDN via the docking station. It is to be understood, however, that other triggers could be used. For example, communicatively coupling the mobile station to mobile station interface 100 may serve as the trigger for registering via the docking station. The mobile station's MDN may also be periodically re-registered, while the mobile station remains communicatively coupled to the docking station. However, when the mobile station is no longer communicatively coupled to the docking station, the mobile station may register via the wireless network instead.

FIG. 4 is a flow chart illustrating an example of how a call placed to the mobile station's MDN may be routed, after the mobile station has registered the MDN as being accessible via the docking station (for example, using the method illustrated in FIG. 3). The process may begin when a call is placed to the mobile station's MDN, as indicated by block 220. In this example, the mobile station's MDN is associated with a point code of the mobile station's home MSC, e.g., MSC 26. Thus, the mobile station's home MSC receives the signaling for the call, as indicated by block 222. For example, MSC 26 may receive an SS7 IAM message, with the mobile station's MDN as the called number, via signaling network 36.

In this example, MSC 26 is not currently serving the mobile station because the mobile station is coupled to the docking station. To locate the mobile station, MSC 26 sends an IS-41 LOCREQ message to HLR 30, as indicated by block 224. The LOCREQ message includes the mobile station's MDN. HLR 30 receives the LOCREQ message and determines from the data record for that MDN that the mobile station is currently being served by call control system 54. HLR 30 then obtains a temporary local directory number (TLDN) from call control system 54, e.g., using an IS-41 ROUTEREQ message, and forwards the TLDN to MSC 26, as indicated by block 226. MSC 26 then routes the call based on the TLDN, as indicated by block 228. In this example, the TLDN is a number that routes the call to media gateway 50. Thus, a bearer path for the call is established between MSC 26 and media gateway 50, e.g., via circuit-switched network 34 or IMT 52.

When the call is routed to media gateway 50, call control system 54 sends a SIP INVITE message to the mobile station, via the docking station, as indicated by block 230. The mobile station receives the SIP INVITE and responsively plays an alert pattern to alert the user of the incoming call, as indicated by block 232. The mobile station may also cause other communication devices communicatively coupled to the docking station, e.g., analog telephone 38, speaker/microphone terminal 40, and/or VoP telephone 44, to play an alert pattern. The alert pattern played by these other communication devices could be the same as played by the mobile station. For example, the mobile station may transmit the alert pattern to the docking station, via mobile station interface 100, and the docking station may then transmit the alert pattern to the other communication devices. Alternatively, the other communication devices may play an alert pattern that is different than the alert pattern played by the mobile station.

The communication devices communicatively coupled to the docking station can then be used to answer the call and/or participate in the call, as indicated by block 234. Such communication devices may include the mobile station, as well as other communication devices such as analog telephone 38, speaker/microphone terminal 40 and/or VoP telephone 44. When the call is answered, a VoP communication session is established between docking station 16 and media gateway 50, i.e., via LAN 42, network access device 48, and packet-switched network 18. In this way, media gateway 50 and MSC 26 may exchange the voice or other media of the call in a TDM format, and media gateway 50 and docking station 16 may exchange the voice or other media in an RTP format, with media gateway 50 converting between the TDM and RIP formats.

Although FIG. 4 illustrates an example in which the mobile station receives a call via the docking station, it is to be understood that the mobile station (and the other communication devices coupled to the docking station) may also be able to originate calls via the docking station, using the mobile station's MDN as the calling party number. Thus, the docking station can effectively extend the use of a mobile station's MDN to other communication devices. Moreover, the docking station enables the mobile station's MDN to be used to originate and receive calls in areas where wireless coverage is poor or unavailable, because the calls are carried via a landline-based VoP network.

FIG. 5 is a flow chart illustrating an example in which the docking station has its own SIP user agent, which the docking station uses for SIP signaling on behalf of the mobile station. The process may begin when the mobile station is coupled to the docking station, as indicated by block 300. In this example, the coupling involves electrically connecting the mobile station to the docking station's recharger contacts. The coupling may also involve communicatively coupling the mobile station to the docking station, e.g., via mobile station interface 100.

The docking station senses, e.g., via sensing circuit 108, that the mobile station is electrically connected to the recharger contacts, as indicated by block 302. In response, the docking station transmits a SIP REGISTER message to register the mobile station's MDN as being accessible via the docking station, as indicated by block 304. Like the FIG. 3 example, the call control system receives the SIP REGISTER message and responsively sends an IS-41 REGNOT message to the mobile station's HLR, as indicated by block 306. In this way, the mobile station's MDN is registered with call control system 54 and with HLR 30 so that calls to the MDN will be routed to the docking station.

The docking station may also periodically sense whether the mobile station is still electrically connected to the recharger contacts, as indicated by block 308. How the docking station re-registers the MDN may depend on whether the mobile station is still electrically connected to the recharger contacts, as indicated by block 310. If the mobile station is still connected, the docking station may transmit another SIP REGISTER message to re-register the MDN as being accessible via the docking station, as indicated by block 312. After re-registering, the docking station may continue to periodically sense whether the mobile station is still electrically connected to the recharger contacts, as indicated by block 308.

If, however, the mobile station becomes disconnected from the docking station's recharger contacts, the docking station may cancel the SIP registration, as indicated by block 314. This cancellation may occur, for example, by means of a SIP BYE message or a SIP REGISTER message with an expiration period of 0. Upon cancellation of the SIP registration, the mobile station may register via the wireless network.

When the mobile station's MDN has been registered as illustrated in FIG. 5, calls to the MDN may be routed to the docking station in a manner similar to that illustrated in FIG. 4. In this case, however, the docking station's SIP user agent is used for SIP signaling, so the docking station receives the SIP INVITE message for a call to the mobile station's MDN. In response to the incoming call, the docking station may alert the mobile station (if it is communicatively coupled to the docking station) and/or other communication devices coupled to the docking station, e.g., analog telephone 38, speaker/microphone 40, and/or VoP telephone 44. The communication devices may then answer the call and/or participate in the call. These communication devices may also originate calls with the mobile station's MDN as the calling party number, using the docking station's SIP user agent to set up the call via packet-switched network 18.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A telecommunication system for extending use of a directory number of a mobile station to a landline connection at a fixed location having a docking station, comprising:
    a wireless wide-area network (WWAN) for wirelessly handling calls of the mobile station, the WWAN including a plurality of mobile switching centers with associated visitor location registers (VLR), the WWAN including a home location register (HLR) storing a data records for mobile stations including a data record containing a profile corresponding to the mobile station, the data record including a VLR identifier indicating a last known location from which the mobile station was registered;
    a public switched telephone network (PSTN) including a bearer network and a signaling network, wherein the bearer network and signaling network are coupled to at least one mobile switching center;
    a packet-switched network exchanging packets using IP addressing;
    a docking station at a fixed location for interfacing with the mobile station when the mobile station is at the fixed location, the docking station being landline coupled to the packet-switched network and having a respective IP address, wherein the docking station or the mobile station implements a session initiation protocol (SIP) user agent when the mobile station is interfaced with the docking station;
    a media gateway coupled to the PSTN and the packet-switched network for converting media formats between the PSTN and the packet-switched network; and
    a call control system including 1) a session initiation protocol (SIP) server for creating a registration of the SIP user agent including the respective IP address of the docking station and the directory number of the mobile station, 2) a signaling gateway coupled to the signaling network for retrieving the data record from the HLR in response to the directory number, and 3) an IP VLR for storing at least a portion of the profile of the mobile station whenever the SIP user agent registers the mobile station at the docking station.

2. The system of claim 1 wherein the SIP user agent periodically re-registers the directory number while the mobile station continues to interface with the docking station, wherein the re-registration includes updating the HLR with a VLR identifier corresponding to the IP VLR.

3. The system of claim 1 wherein the landline connection of the docking station to the packet-switched network comprises a local area network (LAN) and an access device.

4. The system of claim 1 wherein the call control system further comprises a media gateway controller for setting up communication between the PSTN and the packet-switched network.

5. The system of claim 4 wherein the media gateway controller communicates with the signaling system and the HLR via the signaling gateway to set up calls involving the mobile station while it is registered at the IP VLR.

6. The system of claim 1 wherein the SIP user agent cancels a registration of the directory number with the SIP server when the docking station no longer interfaces with the mobile station.

7. The system of claim 1 wherein the docking station comprises:
    recharger contacts for recharging said mobile station;
    a sensing circuit for sensing when said mobile station is electrically connected to said recharger contacts; and
    a packet interface communicatively coupled to the packet-switched network;
    wherein the SIP user agent performs the periodic re-registrations while the mobile station is electrically connected to the recharger contacts.

8. The system of claim 7 wherein the mobile station detects when it is electrically disconnected from the recharger contacts, and in response to the detection registers its VLR identifier of a VLR in the WWAN.

9. A call control system for establishing calls on a landline-based voice-over-packet (VOP) network involving a mobile station having a directory number assigned for a wireless wide-area network (WWAN), wherein the VOP network is coupled to a docking station at a fixed location for interfacing with the mobile station when the mobile station is at the fixed location, wherein the WWAN includes a home location register (HLR) storing a data record containing a profile corresponding to the mobile station, the data record further including a VLR identifier indicating a last known location from which the mobile station was registered, and wherein the VOP network is coupled to the WWAN by a media gateway and by a signaling network, the call control system comprising:
    a session initiation protocol (SIP) server for creating a registration of a SIP user agent corresponding to the mobile station upon connection of the mobile station to the docking station connected to the VOP network at a respective IP address within the VOP network, the registration associating the IP address and the directory number of the mobile station;
    a signaling gateway coupled to the signaling network for retrieving the data record from the HLR in response to the directory number when the registration is created for the mobile station; and
    an IP VLR for storing at least a portion of the profile of the mobile station whenever the SIP user agent registers the mobile station, wherein an identifier of the IP VLR is registered at the HLR via the signaling gateway in response to creation of the registration at the SIP server.

10. The call control system of claim 9 wherein the SIP user agent periodically re-registers the directory number while the mobile station continues to interface with the docking station, and wherein the re-registration includes updating the HLR with the VLR identifier of the IP VLR.

* * * * *